UNITED STATES PATENT OFFICE.

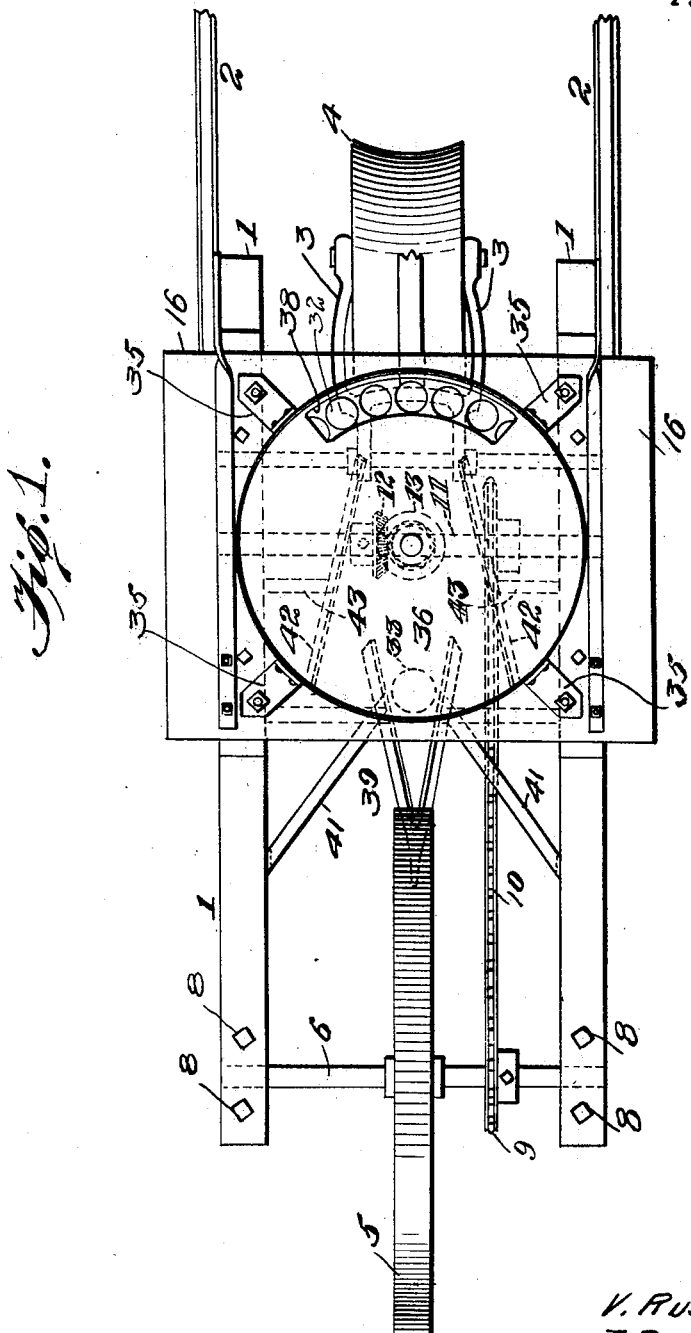

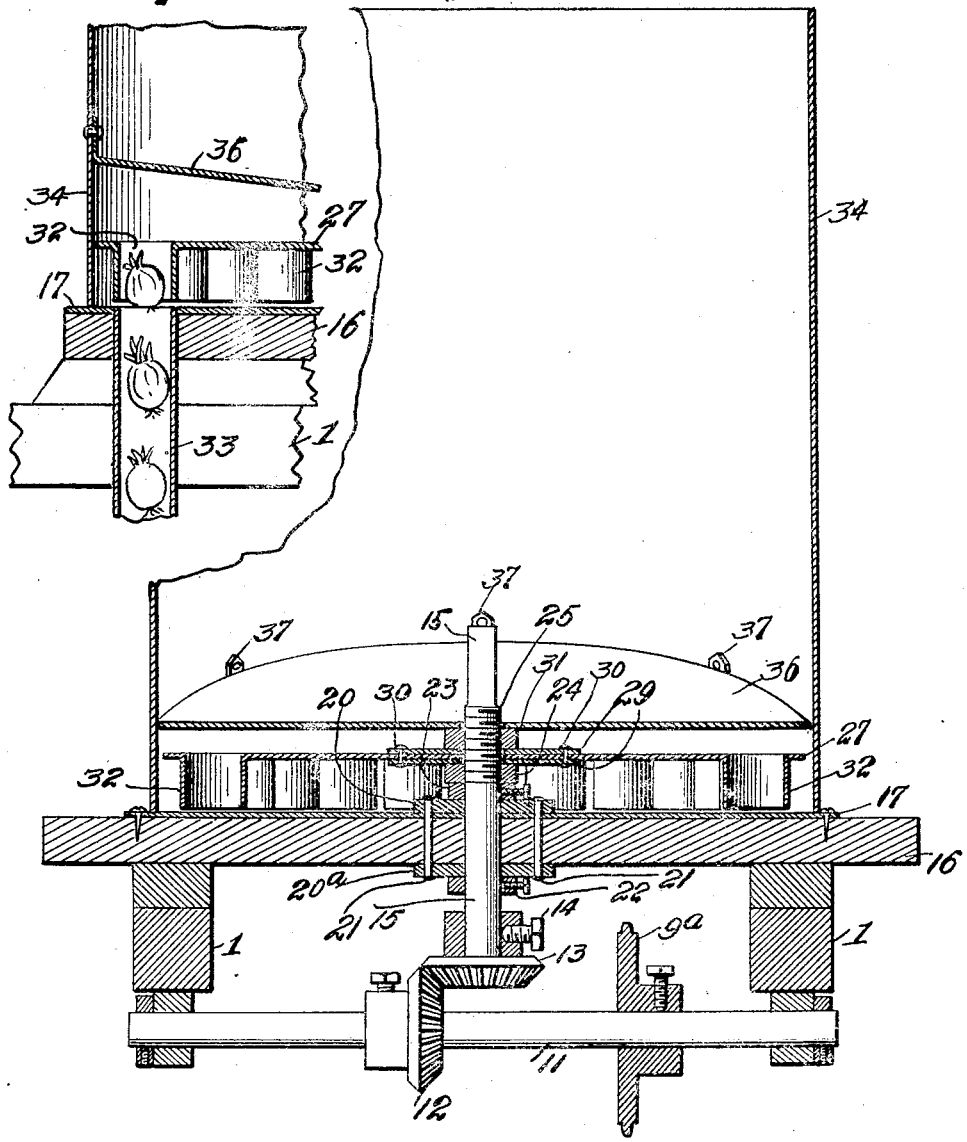

VALENTINE RUSZCZAK AND JOHN RUSZCZAK, OF CHICAGO, ILLINOIS.

ONION-PLANTING MACHINE.

1,371,441. Specification of Letters Patent. Patented Mar. 15, 1921.

Application filed November 19, 1919, Serial No. 339,035. Renewed February 3, 1921. Serial No. 442,165.

*To all whom it may concern:*

Be it known that we, VALENTINE RUSZCZAK and JOHN RUSZCZAK, citizens of United States, residing at Chicago, in the county of Cook and State of Illinois, have invented certain new and useful Improvements in Onion-Planting Machines, of which the following is a specification, reference being had therein to the accompanying drawings.

This invention relates to an onion planting machine, and has for its object the construction of a machine that will positively plant onion sets in a relatively even manner, covering the sets too after they have been planted in the furrow.

Another object of the invention is the construction of an efficient mechanism which will receive the sets in large quantities, then distribute the sets uniformly in a rotary conveyer, and from the conveyer will discharge the sets through a hollow guide into a furrow which the machine makes as it travels over the ground.

With these and other objects in view, our invention comprises certain combinations, arrangements and constructions, as will be hereinafter fully described, illustrated in the accompanying drawings, and more particularly pointed out in the appended claim.

In the drawings:

Figure 1 is a top plan view of a machine constructed in accordance with our invention, while Fig. 2 is an enlarged fragmentary sectional view of the same.

Fig. 3 is an enlarged fragmentary sectional view, showing particularly the hollow guide on line 7—7, Fig. 1.

Referring to the drawings by numerals, 1 designates the frame and 2 the handles of the machine. A pivoted roller frame 3 is attached to the frame 1, and journaled in the lower end of frame 3 is the covering roller 4; this roller 4 serves to cover and pack down dirt after the onion sets have been planted in the furrow.

A supporting wheel 5 is fixedly secured to shaft 6, which shaft is journaled in brackets attached by bolts 8 to the frame 1. Secured to shaft 6 is sprocket wheel 9 and mounted upon sprocket wheel 9 is a sprocket chain 10. A horizontal shaft 11 is suitably journaled upon the frame 1 and attached to the shaft 11 is a sprocket wheel 9ᵃ upon which is mounted the sprocket chain 10. When the supporting wheel 5 is traveling over the ground through the sprocket wheels 9 and 9ᵃ and chain 10, the horizontal shaft 11 will be rotated. Secured to the shaft 11 is a primary beveled gear 12 meshing with an auxiliary beveled gear 13 that is detachably secured, by bolt 14 upon the lower end of vertical shaft 15 (Fig. 2).

The vertical shaft 15 extends through the platform 16. A base plate 17 rests upon the top of platform 16, and this base plate is provided near one edge with a discharge aperture 18, and at its center with a shaft-receiving aperture 19; through the aperture 19 extends the vertical shaft 15. Around the aperture 19 is a reinforcing washer 20, and around shaft 15 and resting against the under face and the platform 16 is another reinforcing washer 20ᵃ. These washers 20 and 20ᵃ are fastened together by rivets 21. To prevent the shaft 15 from moving up too far, a locking collar 22 is secured to the shaft against the lower washer 20ᵃ, and to prevent the shaft from moving downward a secondary locking collar 23 is secured against the upper surface of the upper washer 20. A nut 24 is threaded upon the threaded portion 25 of the shaft 15, this nut 24 engaging the upper face of the locking collar 23. Resting upon the nut 24 is a rotary conveyer 26. This conveyer comprises a thin disk-like plate 27 that has a central aperture 28 for receiving the vertical shaft 15, and on opposite sides of the central portion of the body 27 are reinforcing disks 29 which are fastened together with rivets 30. These disks reinforce the central part of the body of the rotary conveyer, and resting snugly against the upper disk 29 is nut 31; these nuts 24 and 31 lock the rotary conveyer upon the shaft 15 so that when the shaft 15 is rotated similar movement will be imparted to the conveyer 26. Near the edge of the thin plate 27 and arranged in a circular row are depending cup-like receiving cylindrical pockets 32 that are provided with open bottoms so that the onion sets can drop through these depending cup-like pockets, through aperture 18 of the base plate 17, through the corresponding aperture in the platform 16 and then into the hollow guide 33; the pockets are comparatively deep so that different size onions can be readily received and retained until discharged.

The container or hopper comprises a cylinder-like body 34 that is fastened by metal angle brackets 35 to the base plate 17. In the container or hopper is an inclined bottom 36 that is fastened to the sides of the hopper by means of integral lugs 37; this bottom 36 is provided with an elongated slot 38 (Fig. 1) that allows onion sets dumped in the hopper to be discharged into, preferably, five of the cup-like pockets of the conveyer at the same time; the size of the cup-like pockets 32 are usually such as to receive only one onion set, so that the planting of the sets in the row will be even and uniform.

The V-shaped furrow opener 39 (Fig. 1) is placed partly in front of the hollow guide 33 so that the furrow is made by the opener 39 and the onion sets dropped therein as the machine passes over the ground. Primary vertical braces 40 are attached at the upper ends to the frame 1 and the lower ends are attached to the sides of the V-shaped opener 39. Auxiliary inclined braces 41 are also attached at their upper ends to the frame 1 and their lower ends are attached to the primary braces 40 immediately above the furrow opener. A pair of cover blades 42 are held by braces or supports 43 immediately behind the opener 39 so that after the furrow is formed by the opener and the onion sets dropped therein the cover blades force the loose dirt into the furrow over the sets and then the roller 4 further assists in covering the sets, and packing the loose dirt sufficiently upon the sets to properly cover or plant the sets.

It will be understood from the foregoing description that we have provided a machine that will form a furrow, distribute onion sets therein, then satisfactorily cover the sets for completing the planting operation.

While we have described the preferred embodiments of our invention, and have illustrated the same in the accompanying drawings, we desire it to be understood that, in the extensive manufacture of our machine, certain minor alterations or changes may be found desirable by one skilled in the art to which this invention relates, and we, therefore, reserve the right to make such alterations or changes as shall fairly fall within the scope of the appended claim.

What we claim is:

In an onion planting machine, the combination with a frame, of a platform on said frame, a base plate on said platform, a vertical shaft extending through the platform and the base plate, a washer engaging the under face of the platform and surrounding the shaft, a washer engaging the upper face of the base plate and surrounding the shaft, rivets extending through the washers, base plate and platform for securing the same together, a locking collar on the shaft and engaging the upper washer, said shaft provided with threads immediately above the locking collar, a pair of locking nuts threaded upon the shaft above the locking collar, a rotary conveyer mounted upon the shaft between the locking nuts, said conveyer comprising a disk-like body having reinforcing disks upon opposite sides and fastened to the center of the body, said body provided near its edge with a circular row of depending cup-like cylindrical pockets, said pockets open at their bottoms, a hopper above the rotary conveyer and provided with an inclined bottom having an elongated slot for permitting onion sets to pass simultaneously from the hopper into a plurality of pockets of the conveyer, and means for driving the shaft thereby imparting rotary movement to the conveyer.

In testimony whereof we hereunto affix our signatures.

VALENTINE RUSZCZAK.
JOHN RUSZCZAK.